April 11, 1967 J. BERNAT 3,313,337
PROJECTION SCREEN CONSTRUCTION
Filed Aug. 12, 1965 2 Sheets-Sheet 1
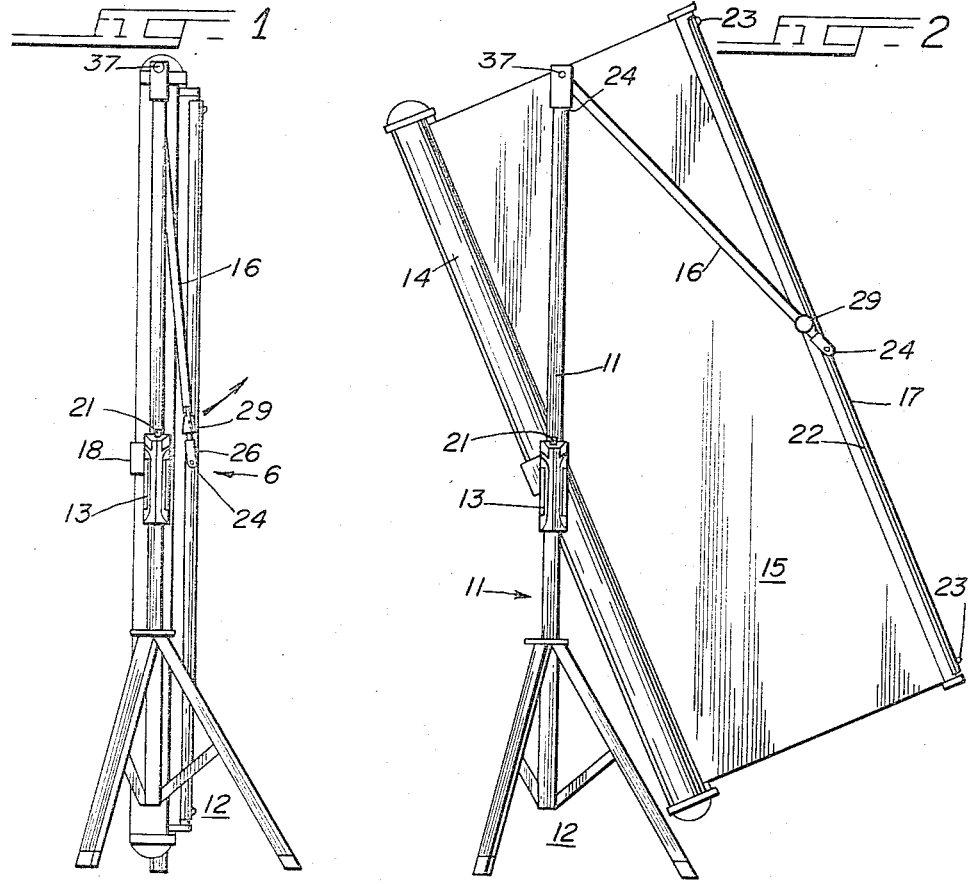
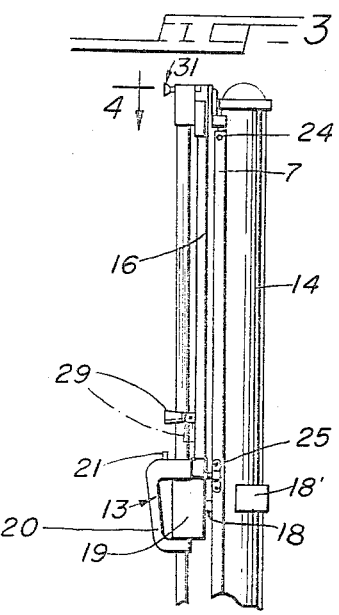
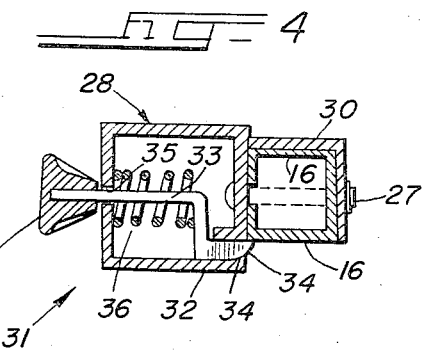
INVENTOR.
JOSEPH BERNAT April 11, 1967  J. BERNAT  3,313,337
PROJECTION SCREEN CONSTRUCTION
Filed Aug. 12, 1965  2 Sheets-Sheet 2
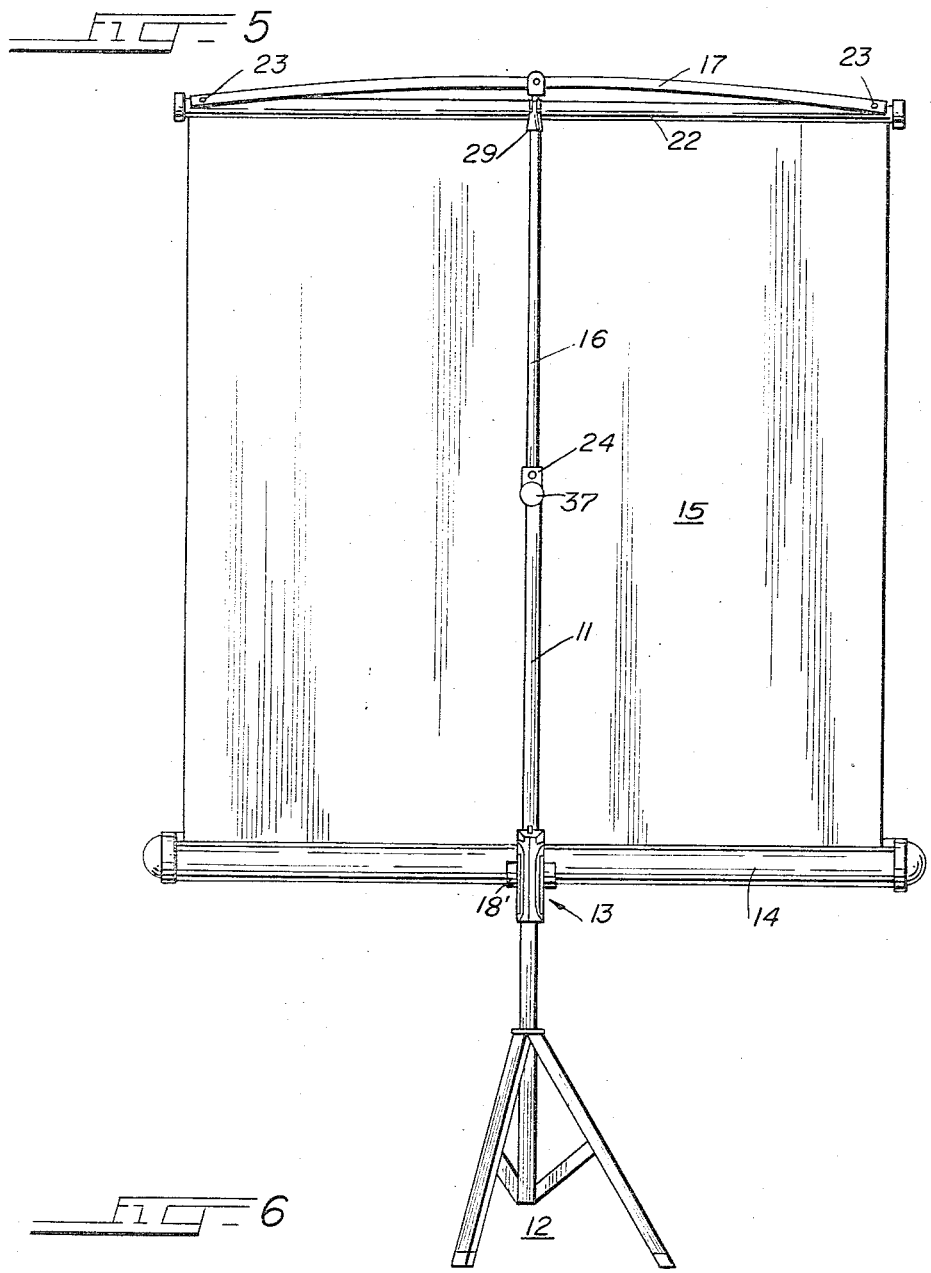
INVENTOR.
JOSEPH BERNAT
BY

United States Patent Office 3,313,337
Patented Apr. 11, 1967

3,313,337
PROJECTION SCREEN CONSTRUCTION
Joseph Bernat, South Bend, Ind., assignor to Da-Lite Screen Company, Inc., Warsaw, Ind., a corporation of Illinois
Filed Aug. 12, 1965, Ser. No. 479,234
6 Claims. (Cl. 160—24)

This invention relates to improvements in portable projection screens, and particularly to an automatic means for shifting the screen for both opening and closing out of and into the screen case.

The main objects of this invention are; to provide an improved mounting of the projection-screen and housing on its supporting standard; to provide an improved mounting of this kind having improved means for the manual shifting of the screen between its rolled-up, non-use position in the housing and its extended, picture-display position; to provide improved means of this kind whereby the screen is automatically pulled out of its housing or is returned thereto automatically and effects the swinging of the screen fabric housing between its vertical, screen-concealing position and its horizontal screen-use position; to provide improved means for latching the screen in its extended, picture-display position; and to provide an improved projection-screen mounting of this kind of such simple construction as to make very economical its manufacture and extremely facile its change between non-use to use position.

In the adaptation shown in the accompanying drawings;

FIGURE 1 is an elevational view of a projection screen of this invention;

FIG. 2 is an elevational view of the same in the process of moving the screen into or out of its picture-viewing position;

FIG. 3 is a right-hand, elevational view of the upper portion of FIG. 1;

FIG. 4 is an enlarged, cross-sectional detail, taken on the plane of the line 4—4 of FIG. 3, showing the latch which secures the screen in its use position as shown in FIG. 5;

FIG. 5 is an elevational view of the rear of this improved screen mounting in its normal use position; and FIG. 6 is an enlarged, fragmentary view of the pivot between the arm and the suspension slat.

The essential concept of this invention involves a connection between the conventional screen slat and/or suspension slat and the upper end of a tripod-supported standard to effect the coordinated shifting of the screen into and out of picture-projection position and the swinging of the housing on its pivot between horizontal and vertical dispositions relative to the standard.

A projection screen embodying the foregoing concept comprises a standard 11 having attached at its lower end the conventional supporting tripod 12 and mounting an adjustable handle 13 structure whereon is pivoted a casing 14 enclosing a spring retracted screen 15 with an arm 16 pivotally connected at its ends to the upper end standard 11 and to a screen suspension slat 17.

The screen case 14 is of conventional construction and is pivoted at 18 to a bracket member 19 at one end and to the saddle 18' at the other end. The bracket member is provided with a handle 20 and slidably mounted on the standard 11 where it is locked in various positions of adjustment under control of a latch button 21 by latch mechanism of suitable form not involved in the present invention.

The screen casing 14 encloses the conventional spring-retracted screen 15 to the outer edge of which is secured the slat 22. The suspension slat 17 is secured to the upper edge of the slat 22 as shown by screws 23 at the distal ends of the suspension slat 17.

The arm 16, of predetermined length, has one end connected to the suspension slat 17 and the other end connected to the upper end of the standard 11. The connection of the one end of the arm 16 to the slat 17 involves a pivot pin 24 seated in pillow-block-like seat 25 secured medially of the slat 17. The other end of the pivot pin 24 is pivotedly secured in the tube 26 which in turn is seated on the end of the arm 16 (see FIG. 6). The connection of the opposite end of the arm 16 to the standard 11 involves a pivot pin 27 (see FIG. 4) secured to a hub cap 28 on the upper end of the standard 11. The arm 16 mounts a hand grip 29 hingedly secured adjacent the pivot 24.

The hub cap 28, seated over and secured to the end of the standard 11, has an integrated L-shaped offset 30 extending outwardly therefrom. The cap 28 mounts a spring-biased latch mechanism 31 (FIG. 4). The offset 30 is spanned by the pivot pin 27 whereby the arm 16 is attached adjacent its upper end to the upper end of the standard 11. The latch 31 has two transversely-offset parts 32 and 33 extending oppositely outward of the hub cap 28 through slots 34 and 35. The latch 31 is biased by a spring 36 to normally project the part 32 into the path of the arm 16 and hold the arm in its extended disposition with respect to the standard 11 (FIG. 5). The part 33, of this latch 31, mounts a finger grip knob 37 by means of which the part 32 may be retracted to permit the release of the arm 16 from its extended positions relative to the standard 11. It is to be noted that the free end of the part 32 is bevel headed as at 34 so that the latch mechanism is a self acting spring bolt.

The suspension slat 17, being connected to the slat 22, as herein explained, tends to begin to bow outwardly, as shown in FIG. 2, as the handle 29 is pulled to right of the position shown in FIG. 1. When the screen 15 is secured in picture-projection position the slat 17 is fully bowed as shown in FIG. 5. Such bowing of the bail 24 tends to effect such a vertical tension on the screen as will ensure the planar surfacing thereof for the benefit of better picture showing.

The screen fabric 15 is shifted into and out of its picture-projecting position in the following manner:

The hand-grip 29 is grasped by one hand of the operator and shifted to the right as shown in the drawing, thus shifting the arm 16 about pivot 24 and automatically withdrawing the screen fabric 15 out from the casing 14 (FIG. 2). With the other hand now gripping the standard 11, to steady it, the screen fabric is gradually pulled almost completely out from the casing 14. Thereupon, the arm 16, as it swings upwardly on the pivot 27, causes the casing 14 to begin its swinging out of its vertical disposition toward a horizontal disposition. As the arm 16 approaches its vertically extended relationship to the standard 11, it contacts and shifts the self acting latch to permit the upper end of the arm 16 to become seated in the L-shaped offset 30 and anchored therein because the latch locks the arm 16 in the offset 30. Thus the arm 16 and the standard 11 are positioned in the same vertical axis.

If any adjustment of the vertical exposure of the screen 15 is desired, it is easily effected by merely gripping the handle 13 and depressing the pin 21 so as to release the handle and bracket from the standard 11 and allow the handle to slide along the standard 11 to the desired position.

To return the screen 15 to its reeled-up position in the housing 14, it is only necessary to momentarily retract the latch 31 to permit the arm to be swung outwardly and downwardly. The spring-activated screen roller within the housing 14 will facilitate the retraction of the screen 15 and coordinate the swinging of the housing 14 toward its retracted position. As the arm 16 approaches its retracted vertical disposition along the standard 11, the latch 31 is retracted because the upper end of the arm 16 lies in a diagonal plane when the slat 17 and the casing 14 are in vertical disposition.

Although but one specific embodiment of this invention is herein shown and described, it will be understood that details of the construction shown may be altered or omitted without departing from the spirit of the invention as defined by the following claims.

I claim:

1. A portable projection screen comprising, a supporting standard, a screen-housing pivotally connected to the standard and enclosing a spring-retracted screen having a slat fixed along its free edge and dimensioned for normal peripheral disposition exteriorly along the housing when the screen is coiled in non-use position within the housing, and an arm pivotally connected to the screen slat and to the standard to effect the coordinated pulling of the screen out of the housing and the swinging of the housing on its standard-pivot from a horizontal to a vertical disposition relative to the standard as the screen is extended into its vertical projection position and the arm shifts into vertical alignment with the standard.

2. A portable projection screen as set forth in claim 1 wherein a latch means fixed to said standard retains the housing, the screen and the arm in their respective relative positions when the screen is in open position.

3. A portable projection screen comprising, a supporting standard, a carrying handle axially shiftable along said standard, a screen housing pivotally connected to the handle and enclosing a spring-retracted screen fabric, a slat fixed along the free edge of said screen fabric and dimensioned for normal peripheral disposition exteriorly along the housing when the screen is coiled in non-use position within the housing, a tension slat secured to said screen slat, an arm pivotally connected to said tension slat at one end and to the standard at the other end to effect the coordinated pulling of the screen out of the housing and the swinging of the housing on its standard-pivot from a horizontal to a vertical disposition relative to the standard as the screen is extended into its vertical projection position and the arm shifts into vertical alignment with the standard.

4. A portable projection screen as set forth in claim 3 wherein a latch means retains the screen and arm in their respective use position.

5. A portable projection screen as set forth in claim 3 wherein a self-acting spring bolt is transversely shiftable on the upper end of the standard adjacent the pivotable connection of the arm to latch the arm in screen-supporting position above the standard.

6. A portable projection screen comprising,
   (a) a supporting standard fixed on an adjustable tripod,
   (b) a handle slidable axially on the standard,
   (c) a screen housing pivotally connected to the handle for swinging between vertical and horizontal positions relative to the standard and enclosing a spring-retracted screen fabric having a slat fixed along its free edge and dimensioned for normal peripheral disposition externally along the housing when the screen is coiled in non-use position within the housing,
   (d) a suspension slat secured to said screen slat,
   (e) an arm pivotally connected at one end medially of the slat and at the other end to the upper end of the standard, and
   (f) a latch on the standard adjacent the pivotal connection of the arm thereto and a self-acting spring-bolt to retain the arm in axial alignment with the standard and to releasably secure the screen in vertical use position.

References Cited by the Examiner

UNITED STATES PATENTS 3,087,535  4/1963  Muller _____ 160—24

FOREIGN PATENTS 220,851  4/1962  Austria.

HARRISON R. MOSELEY, *Primary Examiner.*

J. K. BELL, *Assistant Examiner.*